United States Patent
Shemwell et al.

(10) Patent No.: US 9,863,601 B2
(45) Date of Patent: Jan. 9, 2018

(54) LIGHT EMITTING DIODE BASED PAPI METHOD AND SYSTEM INCORPORATING DIODE ARRAYS AND CYLINDRICAL OPTICS

(71) Applicant: Laser Guidance, Inc., Newcastle, WA (US)

(72) Inventors: David Mark Shemwell, Newcastle, WA (US); Alan August Vetter, Duarte, CA (US)

(73) Assignee: LASER GUIDANCE INC., Newcastle, WA (US)

( * ) Notice: Subject to any disclaimer, the term of this patent is extended or adjusted under 35 U.S.C. 154(b) by 142 days.

(21) Appl. No.: 14/875,574

(22) Filed: Oct. 5, 2015

(65) Prior Publication Data
US 2016/0138775 A1    May 19, 2016

Related U.S. Application Data

(63) Continuation of application No. 13/987,059, filed on Jul. 1, 2013, now abandoned, which is a continuation-in-part of application No. 12/705,025, filed on Feb. 12, 2010, now abandoned.

(51) Int. Cl.
| | | |
|---|---|---|
| *F21V 9/00* | (2015.01) | |
| *F21V 5/00* | (2015.01) | |
| *F21V 5/04* | (2006.01) | |
| *B64F 1/18* | (2006.01) | |
| *B64F 1/20* | (2006.01) | |
| *F21V 9/10* | (2006.01) | |
| *F21K 9/64* | (2016.01) | |
| *F21W 111/06* | (2006.01) | |
| *F21Y 115/10* | (2016.01) | |
| *F21Y 113/13* | (2016.01) | |

(52) U.S. Cl.
CPC .............. *F21V 5/007* (2013.01); *B64F 1/18* (2013.01); *B64F 1/20* (2013.01); *F21K 9/64* (2016.08); *F21V 5/043* (2013.01); *F21V 9/10* (2013.01); *B64D 2203/00* (2013.01); *F21W 2111/06* (2013.01); *F21Y 2113/13* (2016.08); *F21Y 2115/10* (2016.08)

(58) Field of Classification Search
CPC . F21V 5/007; F21V 5/043; F21V 9/10; F21K 9/64; B64F 1/18; B64F 1/20; F21Y 2115/10; F21Y 2113/13; F21Y 2101/00; F21W 2111/06; B64D 2203/00
See application file for complete search history.

(56) References Cited

U.S. PATENT DOCUMENTS

| | | | |
|---|---|---|---|
| 5,287,104 A | 2/1994 | Shemwell | |
| 7,357,530 B2 | 4/2008 | Wang | |
| 8,434,905 B2 | 5/2013 | Tian | |
| 2007/0115141 A1* | 5/2007 | Kaminski | B64F 1/20 340/947 |
| 2008/0007430 A1* | 1/2008 | Wang | B64F 1/20 340/947 |

(Continued)

*Primary Examiner* — Alexander Garlen
(74) *Attorney, Agent, or Firm* — Aeon Law PLLC; Adam L. K. Philipp; Jonathan E. Olson

(57) ABSTRACT

Overcoming limitation in brightness and heating effects for LED based Precision Approach Path Indicators and allowing both colors to be imaged in the far field with the proper abrupt transition between the red and white sectors, making use of linear arrays of LED's and cylindrical optics.

7 Claims, 2 Drawing Sheets

(56) References Cited

U.S. PATENT DOCUMENTS

| | | | |
|---|---|---|---|
| 2010/0123398 A1* | 5/2010 | Tian | H05B 33/0803 |
| | | | 315/119 |
| 2011/0285294 A1* | 11/2011 | Hansler | B64F 1/20 |
| | | | 315/152 |
| 2012/0223255 A1* | 9/2012 | Walker | B64F 1/20 |
| | | | 250/495.1 |

* cited by examiner

LIGHT EMITTING DIODE BASED PAPI METHOD AND SYSTEM INCORPORATING DIODE ARRAYS AND CYLINDRICAL OPTICS

RELATED U.S. APPLICATION DATA

This application is a continuation-in-part of application Ser. No. 12/705,025 filed on Feb. 12, 2010.

BACKGROUND OF THE INVENTION

The Precision Approach Path Indicator, or PAPI, is a well-known and established approach landing aid to provide visual glide slope guidance to approaching aircraft. Aviation authorities have established specific requirements for the behavior of this system; these specifications are codified in both US and International standards. The United States Federal Aviation Administration standards for PAPI systems are in Advisory Circular AC 150/5345-28F. Requirements include, but are not limited to, a light housing assembly that can project a specific pattern of red and white light. Those skilled in the art know that among these requirements are a broad sector that is white in color, and a broad sector that is red in color. Furthermore these red and white sectors have to cover specific angular areas in both elevation and azimuth. In addition the white sector, which is on top, and the red sector, on the bottom, must have a very sharply defined horizontal boundary between the two colors.

In current embodiments this arrangement of projected light is accomplished with a lens that has the same optical power in both the horizontal and vertical axis. A design using such a lens has a very limited area for the light source to be located; furthermore the light source must be substantially similar in both horizontal and vertical extent. Designs of this nature are limited in the total number, and therefore intensity, or Light Emitting Diodes which can be imaged by a single lens. Designs of this type may be found in current commercial production. In addition a design of this nature is taught by Tian et al USP Application 20100123398. This restriction has practical ramifications in terms of limited brightness and high local heat. The design of Tian maintains this two-dimension optical geometry and does not provide relief from the limited brightness and heat dissipation issues of the standard design.

INVENTION DESCRIPTION

Disclosure in this application avoids these limitations by using an optical system that is substantially linear in configuration. In this invention the standard lens of the PAPI design, which focuses in two planes, is replaced by a cylindrical lens whose axis is oriented horizontally. This cylindrical lens is combined in a single optical system with a single mirror with a precision linear edge on one side. This precision linear edge is placed at the focal line of the cylindrical lens, and it is aligned with the axis of the cylindrical lens. On this single axis the image plane of the precision linear edge is substantially at infinity. To complete the optical design two arrays of LED are required. One array is composed of white LED's the other red LED's. It is also possible for these arrays to contain LEDs of other colors that can be operated independently. In addition each of these arrays is substantially linear in that the LED's in the array are arranged to be in substantially the same alignment as the axis of the cylindrical lens. This allows the current design to achieve the required and specified performance while avoiding the limitations of current art. In particular this design can increase brightness to an arbitrary degree by extending the optical system along the axis of the cylindrical lens to any length required to produce a specified output. For example the apparent brightness of the system can be increased by a factor of 2 by increasing the length of the system along the cylindrical lens axis by a factor of 2, no other changes would be required. Any specified brightness level for the PAPI may achieved by scaling the design along this axis. Furthermore this design alleviates the heating problem found in LED designs using conventional two dimensional arrays, in that the LED's are arranged substantially linearly so that each LED has the ability to deposit into an area of the heat sink that is not surrounded by other LED's which also produce heat. This is not the case in the invention taught by Tian or other two-dimensional array designs found in commercial LED PAPI systems.

Typically PAPI (Precision Approach Path Indicators), rely on conventional light sources and use approximately 2400 watts of electrical power. It is possible to greatly reduce the electrical consumption by switching to high powered LED's (light emitting diodes), and several commercial companies produce LED based PAPI systems. However, these devices require a total brightness that is much higher than usually available from LED light sources. The standard approach is to cluster these LED's into a 2 dimensional array, however it is then very difficult to cool the LED's adequately. In this invention the design uses a linear array of LED's, a linear sector partition optic, and cylindrical lenses to provide the appropriate white and red PAPI sectors.

SUMMARY OF THE INVENTION

In general terms the current invention uses the technique of cylindrical optics in combination with rows of white and red Light Emitting Diodes (LED's) to provide approach path indications to approaching aircraft of the type known in the industry as PAPI (Precision Approach Path Indicator). The incorporation of a cylindrical optical system with a sector delineating mask at the back focal point of the cylindrical lens into the general functional design of a PAPI optical system is a major departure from current art and the primary feature of this new invention.

The basic function of this invention is as follows: Two sets of LED arrays located in a non-image plane, one white in color and the other red in color are incident on a beam sharing optic, which in this invention is a mirror with a precision linear edge. The beam sharing optic is also reflective on one surface and oriented in such a manner as to allow either the red or white light to be directed towards the cylindrical lens, while allowing the remaining color to also proceed to the cylindrical optic by freely passing the precision linear edge. The precision linear edge is located at substantially the focal plane of the cylindrical optic so that one of the two color is reflected towards the cylindrical optic, while the other is allowed to proceed to the cylindrical optic projecting past (above or below) the precision linear edge. In this fashion this single linear mirror allows both colors to be imaged in the far field with the proper abrupt transition between the red and the white sectors of the PAPI system. This single mirror performs both the function of combining the red and white light and delineation of the red sector from the white sector. The cylindrical lens then reimages the beam sharing optic so that the white and red sectors are properly formed in an expanding beam for the PAPI system to function properly.

This current invention has the addition benefit of superior performance when a single, or group of the LED array fails. In standard two dimensional optical designs, failure of a particular LED will result in one area of the projected signal to be less intense than desired. This is due to the two dimensional imaging characteristics of the standard design. In this invention, the nature of the cylindrical optical system causes the light from the LED array to be integrated along the axis parallel to the axis of the cylindrical lens. Due to this integration, a failure of one LED does not result in limited area that is dimmer as it would in the standard design.

The optical system must also be protected from the weather, have a means for mounting to standard airport mounting systems, and have a means for control of the brightness of the light. In an alternate embodiment the white and red sector signals can come from separate boxes stacked on top of each other each with a linear array for the white and red sectors respectively, and separate cylindrical optical systems. In this case the beam sharing optic is replaced by a sector delineation mask in each cylindrical optical system. This invention has the advantage over current art in that it can save up to 10 times the electricity (using as little as 200 watt) and maintenance of current PAPI's. An additional advantage is found in the linear nature of this optical system which allows for high levels of brightness of the projected light while providing a superior arrangement for cooling the LED's.

DETAILED DESCRIPTION

Figure 1:
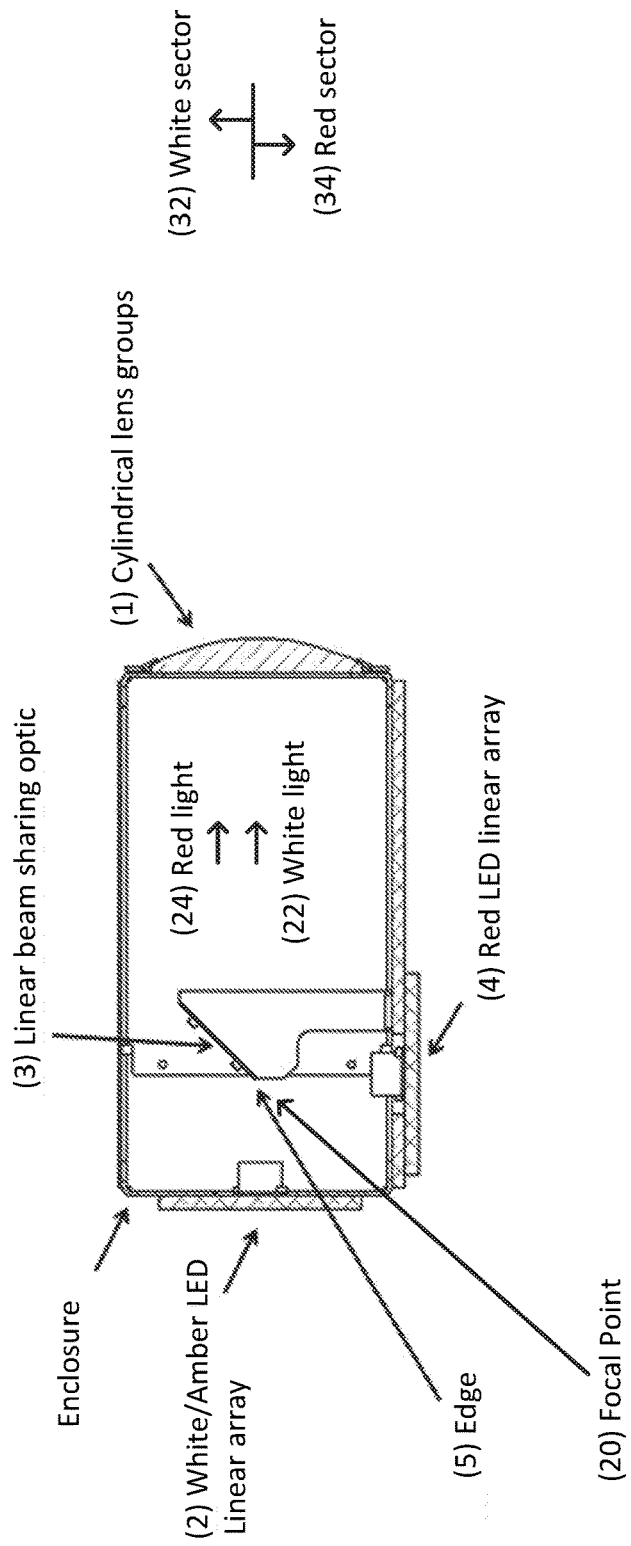
FIG. 1 shows the layout of the cylindrical optical system with its LED arrays, beam combining optic, and cylindrical lens system

FIG. 1 shows the basic layout of the optical system. An array of LED's of the first color (2) is mounted on the optical head, while an array of LED's of the second color (4) is mounted onto the same optical head. Light from these two arrays of LED is incident on a beam sharing optic (3), or alternatively on a sector delineating mask having an edge (5) at the back focal point (20) of the cylindrical lens. The beam sharing optic is also linear and directs the red light (24) or white light (22) towards the cylindrical lens, while allowing the remaining color to also proceed to the Cylindrical Lens (1). The beam sharing optic also delineates the red sector (34) from the white sector (32). The cylindrical lens then reimages the beam sharing optic so that the white and red sectors are properly formed in an expanding beam for the PAPI system to function properly. In an alternate embodiment the white sector and red sector signals can come from separate boxes stacked on top of each other each with a linear array for the white and red sectors respectively, and separate cylindrical optical systems. In this case the beam sharing optic is replaced by a sector delineation mask in each cylindrical optical system.

Figure 2:
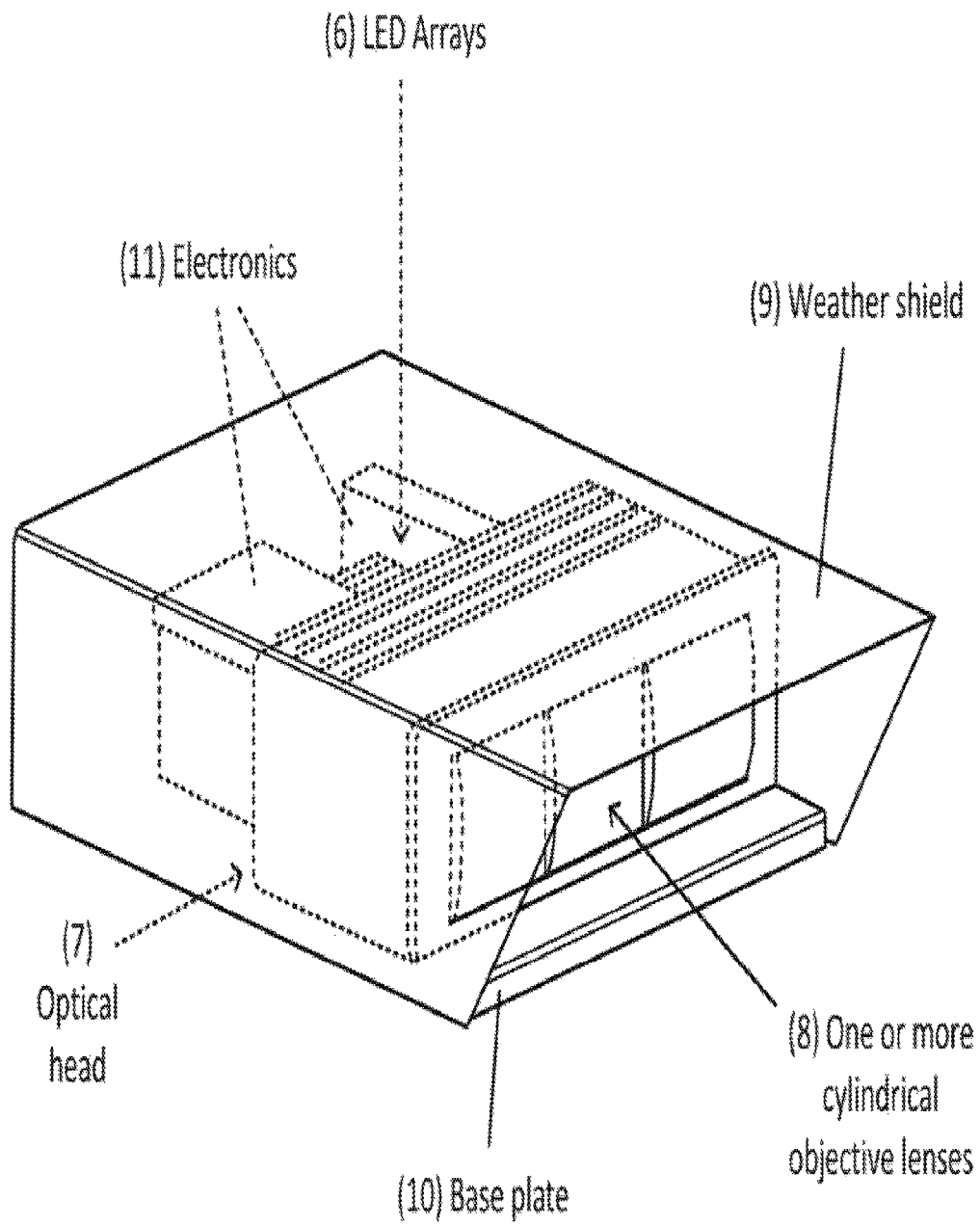
FIG. 2 shows one specific embodiment of the LED PAPI arrangement with a cylindrical optical system

The optical system must also be protected from the weather and have a means for mounting to standard airport mounting systems, as well as placement for electronics and other supporting functions. One practical embodiment of this invention is shown in FIG. 2. As in FIG. 1, FIG. 2 shows the LED arrays (6) (one is hidden from view in this perspective but noted by the arrow), and cylindrical lens system (8). The (7) optical head to which the cylindrical lens and LED arrays are mounted is mounted on a base plate (10) that provides support for the optical head as well as the various electronic packages (11) required to drive the LED arrays and support other functions such as control of brightness and fault detections. In one such embodiment the brightness is controlled by rapidly switching the LED light on and off at a rate that cannot be detected by the human eye. This sort of brightness control is unique to the LED light source and is not available to a PAPI system with contains standard incandescent lights. The entire device is covered by a weather cover (9) for protection from rain and snow.

One advantage of this invention is that it is possible to increase the output power of this design to any level required simply by adding more LED's and optics to the linear array without encounter overheating issues. The length of the array is linear related to the total output of the device adding length will, for any given LED design, increase the possible output of the device in concert with the increase in length. The increase in length has no negative effect on the devices' performance since the cylindrical optical system integrates this linear array at the operating range making it appear to be a single light source.

The optical system of this invention also provided flexibility in terms of the apparent color of the projected light. The current high powered LED's that are white in color are often not the proper color. It is possible to use a linear array of "warm white" LED's but this is not as efficient. In this design one option is to use a white, amber, and perhaps some green to achieve the proper color. The cylindrical optical system integrates these separate colors to provide the proper "aviation white" at the operating distance of the PAPI so that the white sector of the PAPI appears as a pure white to the user.

In this invention the linear nature of the optical systems allows for the LED's to be spread out linearly in their array, rather than in a two dimensional array. The linear arrangement allows for enhanced cooling of the LED array since each the waste heat from each LED can propagate laterally from the LED without encountering another LED which would lead to a buildup of waste heat. This build up of waste heat is a limiting factor for LED operation, making the linear array very advantageous.

Although the present invention has been set forth in terms of specific embodiments, it will be apparent to those of skill in the art that numerous modifications and variations can be made without departing from the true spirit and scope thereof as set forth in the following claims.

What is claimed is:

1. A Precision Approach Path Indicator system, comprising:
   (a) a plurality of LEDs arranged in substantially linear arrays respectively configured to produce red and white light;
   (b) a means for brightness control operably coupled to the plurality of LEDs;
   (c) a beam combining or sector delineating optic; and
   (d) one or more cylindrical lenses configured to reimage an edge of the beam combining or sector delineating optic so as to project red and white sectors from the plurality of LEDs arranged in the substantially linear arrays aligned along said edge respectively configured to produce the red and white light.

2. The Precision Approach Path Indicator system of claim 1, comprising:

wherein said optic is a mirror that has a precision linear edge at a back focal point of the one or more cylindrical lenses as the edge of the beam combining or sector delineating optic.

3. The Precision Approach Path Indicator system of claim 1, comprising:
wherein said optic is a beam combining optic at a back focal point of the one or more cylindrical lenses.

4. The Precision Approach Path Indicator system of claim 1, comprising:
wherein said on or more cylindrical lenses is a single cylindrical lens.

5. A Precision Approach Path Indicator system, comprising:
(a) a plurality of LEDs arranged in first and second substantially linear arrays;
(b) a brightness control operably coupled to the plurality of LEDs;
(c) a sector delineating optic; and
(d) a cylindrical lens configured to image an edge of the sector delineating optic so as to project respective sectors from the plurality of LEDs arranged in the first and second substantially linear arrays aligned along said edge.

6. The Precision Approach Path Indicator system of claim 5, comprising:
wherein said sector delineating optic is a mirror that has a precision linear edge at a back focal point of the cylindrical lens as the edge of the sector delineating optic.

7. A Precision Approach Path Indicator method, comprising:
(a) arranging a plurality of LEDs in first and second substantially linear arrays;
(b) positioning a sector delineating optic;
(c) causing a cylindrical lens to image an edge of the sector delineating optic so as to project respective sectors from the plurality of LEDs arranged in the first and second substantially linear arrays; and
(d) controlling a brightness of the respective sectors projected from the plurality of LEDs arranged in the first and second substantially linear arrays aligned along said edge.

\* \* \* \* \*